United States Patent
Brown et al.

(10) Patent No.: US 10,261,888 B2
(45) Date of Patent: Apr. 16, 2019

(54) EMULATING AN ENVIRONMENT OF A TARGET DATABASE SYSTEM

(71) Applicants: Douglas P. Brown, Rancho Santa Fe, CA (US); Anita Richards, San Juan Capistrano, CA (US); James Peter Colby, Jr., San Diego, CA (US); Jeffrey S. Shelton, San Diego, CA (US)

(72) Inventors: Douglas P. Brown, Rancho Santa Fe, CA (US); Anita Richards, San Juan Capistrano, CA (US); James Peter Colby, Jr., San Diego, CA (US); Jeffrey S. Shelton, San Diego, CA (US)

(73) Assignee: Teradata US, Inc., San Diego, CA (US)

(*) Notice: Subject to any disclaimer, the term of this patent is extended or adjusted under 35 U.S.C. 154(b) by 496 days.

(21) Appl. No.: 13/650,201

(22) Filed: Oct. 12, 2012

(65) Prior Publication Data
US 2014/0108001 A1   Apr. 17, 2014

(51) Int. Cl.
   *G06F 9/455*   (2018.01)
   *G06F 11/36*   (2006.01)
(52) U.S. Cl.
   CPC ................. *G06F 11/3664* (2013.01)
(58) Field of Classification Search
   CPC .................................................. G06F 11/3664

USPC ............ 703/23; 718/105; 719/318; 707/718, 707/764, 792, 797, 802
See application file for complete search history.

(56) References Cited

U.S. PATENT DOCUMENTS

2003/0093408 A1* 5/2003 Brown et al. ..................... 707/2
2007/0174346 A1* 7/2007 Brown ............... G06F 17/30286

OTHER PUBLICATIONS

Teradata (Teradata Dynamic Workload Manager (Administration Guide, Jan. 2005), pp. 1-126).*
Teradata (Teradata Workload Analyzer, User Guide version 12.0, Jul. 2007 (120 pages)).*
Teradata (Teradata Dynamic Workload Manager, User Guide (320 pages) Aug. 2008).*

* cited by examiner

*Primary Examiner* — Andre Pierre Louis
(74) *Attorney, Agent, or Firm* — Ramin Mahboubian

(57) ABSTRACT

A test system receives environment information of a target database system, where the environment information includes information relating to hardware and software components of the target database system, and one or more of: definitions of workloads in the target database system, and settings of a scheduler in the target database system. The test system emulates an environment of the target database system using the received environment information, and database software is executed in the emulated environment in the test system.

13 Claims, 4 Drawing Sheets

EMULATING AN ENVIRONMENT OF A TARGET DATABASE SYSTEM

This application is a Continuation and takes priority (i) from U.S. application Ser. No. 12/649,560, entitled "EMULATING AN ENVIRONMENT OF A TARGET DATABASE SYSTEM", by Douglas Brown et. al., filed Dec. 30, 2009, which is hereby incorporated herein by reference in its entirety and for all purposes.

This application is a Continuation in Part and takes priority (i) from U.S. application Ser. No. 11/435,523, entitled "MANAGING DATABASE UTILITIES TO IMPROVE THROUGHPUT AND CONCURRENCY," by Anita Richards et. al., filed May 17, 2006, which is hereby incorporated herein by reference in its entirety and for all purposes.

This application is also a Continuation in Part of (ii) U.S. application Ser. No. 11/716,889, entitled, "VIRTUAL REGULATOR FOR MULTI-DATABASE SYSTEMS," by Douglas Brown et. al. filed on May 12, 2007, which is hereby incorporated herein by reference in its entirety and for all purposes.

BACKGROUND

A database is a collection of stored data that is logically related and that is accessible by one or more users or applications. The collection of stored data can be in relational tables (or other database structures). Improved database technologies have enabled the storage of relatively large amounts of data that can be efficiently accessed and manipulated. Some database management systems include multiple computer nodes for enhanced performance.

The database management software for parallel database management systems can be quite complex. Consequently, the testing of such database management software can be challenging. In testing complex software, the test environment (at the site of the software developer) is usually quite different from the actual operating environment (production environment). The difference between the test environment and an actual production environment can lead to inaccurate testing of the database management software.

SUMMARY

In general, according to an embodiment, a test system receives environment information of a target database system, where the environment information includes information relating to hardware and software components of the target database system, and one or more of: definitions of workloads in the target database system, and settings of a scheduler in the target database system. The test system emulates an environment of the target database system using the received environment information, and database software is executed in the emulated environment in the test system.

Other or alternative features will become apparent from the following description from the drawings, and from the claims.

BRIEF DESCRIPTION OF THE DRAWINGS

Some embodiments of the invention are described with respect to the following figures.

DETAILED DESCRIPTION

Figure 1:
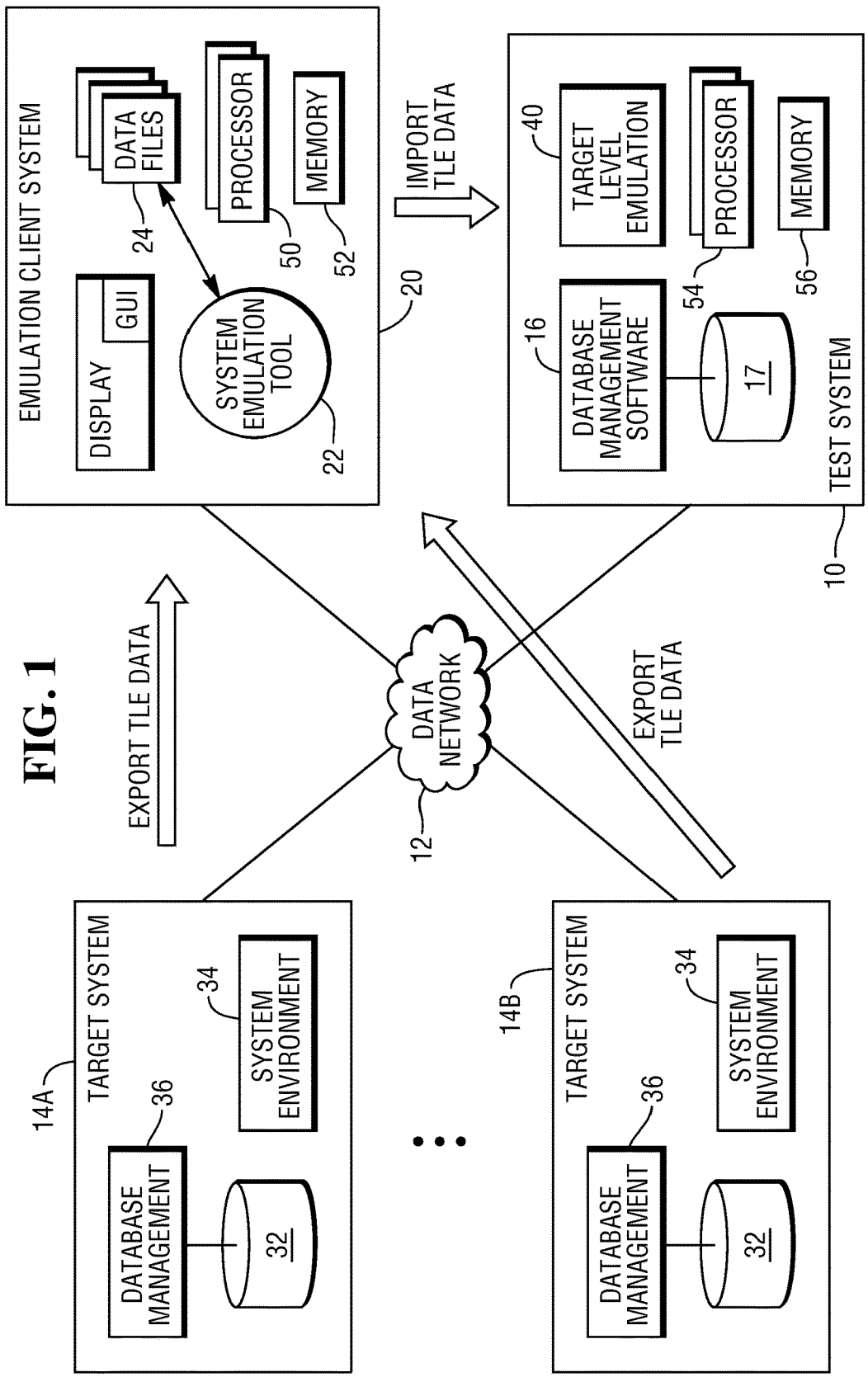
FIG. 1 is a block diagram of an example arrangement that includes target database systems, an emulation client system, and a test system, in accordance with some embodiments.

As database management systems have become more complex, setting up a test environment that accurately emulates a target database system environment has become more challenging. The target database system environment is made up of both hardware and software. In some implementations, the target database system can be a parallel database management system that has multiple computer nodes, where each computer node may have one or more processors. In addition, the database management software of the database management system can include various software components, including parsing engines and processing units that are executable in parallel. The environment of the target database system also includes the actual data itself, which is stored in relational tables, views, indexes and/or other database structures.

Additionally, the target database management system can include a workload management subsystem and a priority scheduler. The workload management subsystem is able to satisfy a set of workload-specific goals. In one example, the workload management subsystem can perform one or more of the following operations: (1) assign incoming requests to workload groups (as defined by workload definitions), and assigning goals (service level goals) to the workload groups; (2) monitoring the execution of the workload groups against their goals; (3) regulating (adjusting and managing) the workload flow and priorities to achieve service level goals; and (4) correlating the results of workloads and taking action in response to the correlating. A "workload group" is a set of requests that have common characteristics, such as an application that issued at the requests, a source of the request, type of query, priority, response time goes, throughput, and so forth. A workload group is defined by a workload definition, which defines characteristics of the workload group as well as various rules associated with the workload group. A workload group is also associated with one or more exception criteria. If an exception criterion (or multiple exception criteria) is met during execution of a query that is part of a particular workload group, then a specified exception action (or actions) can be taken with respect to the query. For example, the query can be reassigned to another workload group, aborted, or an alert can be generated.

The following are some examples of exception criteria: threshold-based criteria (which trigger as soon as a threshold is exceed), such as predefined number of rows, input/output (I/O) count, spool size (where a "spool" is an intermediate table to store intermediate results), blocked time (the amount of time that a particular software component is blocked from performing a task by another software component), response time, number of processing units, processor time, and so forth; qualified criteria (that trigger after a situation is present for a qualification time), such as an amount of processor time per I/O cycle, or skew (which refers to a situation in which a request is being executed on one of multiple processing units while other processing units sit idle); and/or other criteria.

A priority scheduler manages relative priorities of various tasks executing in the database management system. The priority scheduler is a relatively low-level component, which in some implementations can be part of an operating system, or more generally, interacts with the operating system to perform management of relative priorities of tasks. In some embodiments, weights are assigned to allocation groups, and priorities of such allocation groups are defined based on such weights. Different allocation groups reflect different categories of tasks. The priority scheduler schedules tasks of different allocation groups for execution according to their respective priorities.

Workload groups are mapped to the allocation groups according to classification criteria. In some implementations, there can be a many-to-one relationship between workload groups and allocation groups—in other words, multiple workload groups can map to a particular allocation group. There can also be a one-to-one relationship between a workload group and an allocation group. The mapping of workload groups to allocation groups is based on characteristics of the workload groups as compared to the characteristics associated with the allocation groups.

In addition to weights that define relative priorities of allocation groups, additional rules can be set to define limits on the amount of a processor that a given allocation group can consume. If an allocation group, which has a defined processor utilization ceiling, exceeds the predefined limit, then work for that allocation group can be temporarily throttled (suspended).

In some embodiments, the settings of the priority scheduler include the weights assigned to the allocation groups, as well as various rules that may be assigned to the corresponding allocation groups.

Although reference is made to the priority scheduler according to some implementations as discussed herein, it is noted that other implementations and variants of the priority scheduler are contemplated to be within the scope of some embodiments of the invention.

In setting up an environment at a test system to emulate the environment of a target database system that includes a workload management subsystem and priority scheduler as discussed above, performing emulation based just on the hardware and software components, and samples of data from the target database system, will not allow for an accurate emulation of the target database system environment. In accordance with some embodiments, in addition to importing the foregoing information (information relating to hardware and software components and samples of data from the target database system) into a test system to perform target system emulation, information related to the workload management subsystem and/or information relating to the priority scheduler can also be imported to the test system for emulating the environment of the target database system.

FIG. 1 shows an example arrangement having plural target database systems (14A, 14B), a test system 10, and an emulation client system 20 in which a system emulation tool 22 is executable. Note that the emulation client system 20 can be integrated with the test system 10 into a single platform in some embodiments.

In one example, the target database system 14A is located at a first customer site, while the target database system 14B is located at a second customer site. Each target database system 14 (14A or 14B) includes database management software 36 that manages access of data in a respective database 32. In accordance with some embodiments, the database 32 is distributed across plural processing units and corresponding storage modules in each target database system 14. For example, if the target database system 14 is a TERADATA® database system from Teradata Corporation, then the processing units are AMPs (access module processors).

A "processing unit" of the database system refers to an element of the database system that performs query processing tasks associated with the database system. For example, a processing unit is able to insert, delete, or modify content of tables; creates, modifies, or deletes definitions of tables; retrieves information from definitions and tables; locks databases and tables; and so forth. A target database system can include one computer node or plural computer nodes, with each computer node capable of executing one or plural processing units.

Each target database system 14 is associated with a system environment 34, which is made up of system-specific information as well as database-level information. As used here, "environment information" of a target database system 14 refers to the system-specific information and/or database-level information and/or any portion of the system-specific or database-level information.

System-specific information includes cost-related information, such as the number of computer nodes in the target system, the number of processors or CPUs (central processing units) per node, the number of virtual processors (e.g., AMPs or parsing engines) in each computer node, and other system information. The system-specific information further includes workload management information and/or priority scheduler settings. Database-level information includes random samples, data manipulation language (DML) query statements, data definition language (DDL) query statements, and the actual data of the database itself.

The target database systems 14A, 14B are coupled to a data network 12. The data network 12 can be a private network (such as a local area network or wide area network) or a public network (such as the Internet). The emulation client system 20 is also coupled to the data network 12. In some implementations, various data files 24 stored in the emulation client system 20 contain environment information exported from respective target database systems 14A, 14B. The system emulation tool 22, executable on one or more processors 50 in the emulation client system 20, is able to export the environment information from the target database systems 14A, 14B over the data network 12. In the emulation client system 20, the one or more processors are connected to memory 52. The environment information is then imported into the test system 10. In implementations in which the client emulation system 20 is integrated with the test system 10, the system emulation tool 22 and data files 24 are located on the same platform as the components of the test system 10. The environment information imported to the test system 10 is maintained as target-level emulation data 40.

Based on the target-level emulation data 40, an emulated target environment for emulating a target database system (14A or 14B) is set up in the test system 10. Database management software 16 in the test system 10 is executable on or more processors 54 in this emulated target environment. The one or more processors 54 are connected to memory 56.

The database management software 16 includes an optimizer (not shown), which is able to select a query plan for a given query that accesses data in a database 17 managed by the database management software 16. Running in the emulated target environment, the optimizer identifies and selects the most efficient query plan (from among plural query plans) for a given query.

The environment information that is imported into the test system 10 can include the following types of information. The environment information can include cost-related information, random samples of a target database system, information relating to the workload management architecture ("workload management information), and/or settings of the priority scheduler.

Cost-related information includes the following types of information, in accordance with some examples: number of computer nodes, number of processors per node, number of processing units per computer node, the amount of memory allocated per processing unit, MIPS (millions of instructions per second) for each processor, persistent storage access speeds (e.g., disk access speeds), network access speeds, and/or other system-specific information.

Random samples include a sample of statistics that are captured from a segment (less than all) of the data stored in the target database system. Faster retrieval of statistics is made possible by collecting the samples from only a segment of the data. Thus, for example, in a target database system having N (N>1) processing units, the random samples are collected from M (M<N) processing units. The M processing units from which the random samples are collected are selected at random.

Examples of information contained in a random sample include the number of rows of a table, number of indexes defined on the table, the minimum row length, maximum row length, and/or other information. The foregoing information is referred to as "statistics."

In emulating an environment of a large database system for query optimization purposes, the ability to capture random samples is useful for optimizers to accurately determine performance of query plans. During normal operation, statistics are collected and stored by the database system. The statistics are accessed by the optimizer when selecting a query plan for a given query. However, such statistics may not be easily captured for loading into a test system that is separate from the production database system. For a large target database system, capturing statistics of all tables (which can number in the thousands to tens of thousands) is often a time-consuming process, sometimes taking hours or days. Without the availability of accurate statistics of tables of the target database system, execution of the optimizer in the test system 10 likely will not produce accurate results. Random samples can be captured in a substantially more time-efficient manner, with statistics generated based on the random samples for use by the optimizer in the test system 10.

As noted above, the environment information that is imported into the test system 10 can also include information relating to the workload management subsystem of the target database system. Such information includes workload definitions and exception criteria, as discussed above.

In addition, the environment information that is imported into the test system 10 can include settings associated with a priority scheduler, including weights assigned to allocation groups and various rules associated with the respective allocation groups.

By using the foregoing information together to emulate the environment of the target database system in the test system, a more precise emulated target environment can be provided for testing performance of database software.

Figure 2:
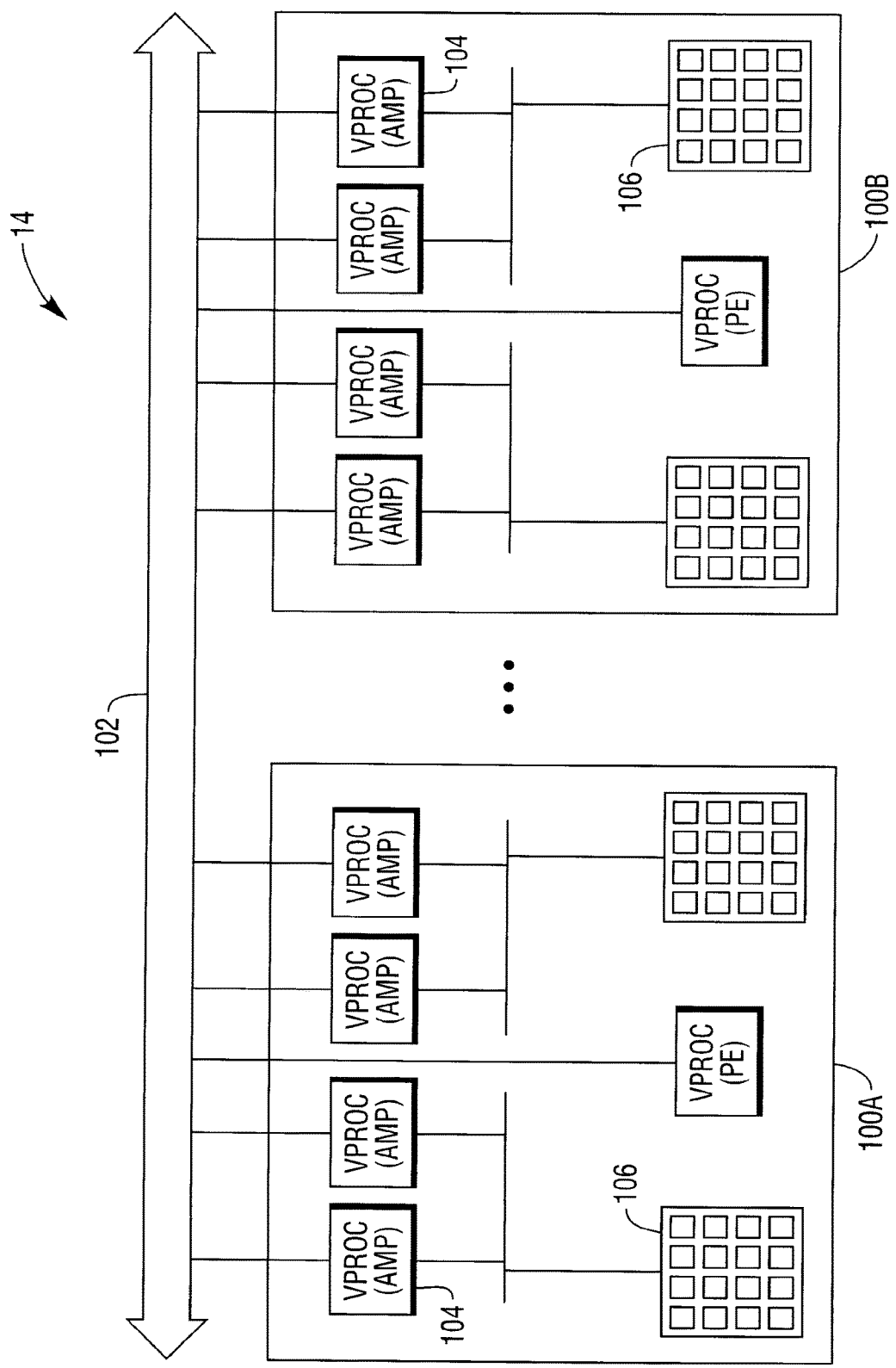
FIG. 2 is a block diagram of an example target database system that can be emulated in accordance with an embodiment.

FIG. 2 shows an example arrangement of a target multi-node parallel database system 14. The target database system 14 has plural computer nodes 100A, 100B, and so forth, coupled by an interconnect network 102. Each computer node includes a single processor or multiple processors.

Each computer node 100 also includes multiple virtual processors (VPROCs) 104, which include parsing engines (PEs) and/or processing units. A parsing engine receives a query, interprets the query, checks the query for proper syntax, and sends out executable actions to be performed by the processing units with respect to data stored in storage modules 106.

Figure 3:
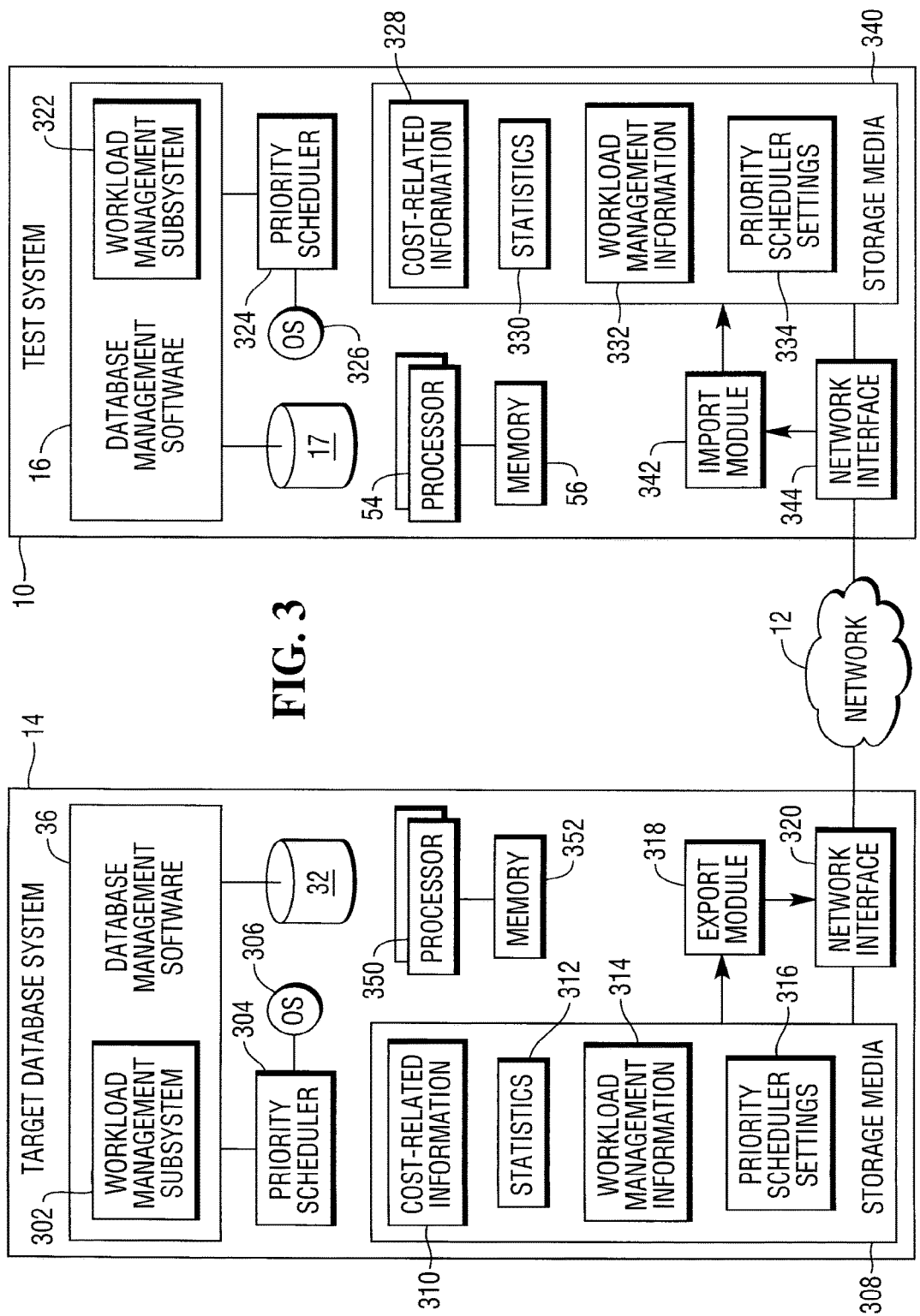
FIG. 3 is block diagram of components of a target database system and a test system, according to an embodiment; and d.

FIG. 3 shows further components of the target database system 14 and test system 10, according to a specific embodiment. The database management software 36 of the target database system 14 includes a workload management subsystem 302, features of which are described above. In addition, the target database system 14 includes a priority scheduler 304, which in some embodiments employs services offered by an operating system 306.

A storage media 308 in the target database system 14 stores various information (in storage media 308) that can be exported for performance of emulation in the test system 10. Such information includes cost-related information 310 (information regarding characteristics of the hardware and software of the target database system 14), statistics 312 (which are samples captured from tables and/or other database structures in the target database system 14), workload management information 314 (which defines workload groups as well as exception criteria), and priority scheduler settings 316 (settings associated with the priority scheduler 304).

The cost-related information 310, statistics 312, workload management information 314, and priority scheduler settings 316 are exported as environment information by an export module 318 in the target database system 14. The export module 318 is executable on one or plural processors 350 in the target database system 14. The processor(s) 350 can be connected to memory 352. The exported environment information is provided through a network interface 320 of the target database system, which is communicated over the network 12.

As shown in FIG. 1, the environment information from the target database system is exported to the emulation client system 20. Alternatively, in embodiments in which the emulation client system 20 and test system 10 are integrated together, the environment information can be exported directly to the test system 10.

The test system 10 also includes database management software 16 that includes a workload management subsystem 322. The test system 10 further includes a priority scheduler 324, and an operating system 326. The workload management subsystem 322 is configured according to workload management information 332 stored in a storage media 340 in the test system 10. The workload management information 332 contains information based on the workload management information 314 of the target database system 14.

The storage media 340 further stores priority scheduler settings 334, to define the settings for the priority scheduler 324. The priority scheduler settings 334 are based on the priority scheduler settings 316 of the target database system 14.

The storage media 340 further stores cost-related information 328 (based on the cost-related information 310 of the target database system 14), and statistics 330 (based on the statistics 312 of the target database system 14).

The test system 10 includes an import module 342 executable on the one or more processors 54 for importing environment information used for emulation into the storage media 340 through a network interface 344.

In one embodiment, SQL (Structured Query Language) DIAGNOSTIC statements are used to extract environment information from a target database system 14 and to establish the environment information in corresponding data structures and files in the test system 10. In some examples, the statements include a DIAGNOSTIC DUMP COSTS statement and DIAGNOSTIC SET COSTS statement. The DIAGNOSTIC DUMP COSTS statement, when issued to the target database system 14, dumps requested environment information into rows of a cost table in the target database system. The DIAGNOSTIC SET COSTS statement, when issued to the test system 10, sets up the identified environment information in the predefined data structures, and instructs the optimizer in the test system 10 to use environment information of a specified target database system. In some implementations, the DIAGNOSTIC SET COSTS statement can specify a time duration during which the target environment information is to be used. The specified time duration can be based on use of a keyword, such as SYSTEM, SESSION, REQUEST, and IFP. The keyword can be specified in the DIAGNOSTIC SET COSTS statement.

If the REQUEST keyword is specified, then the target environment information for the target database system is in effect only for the current request. If the SESSION keyword is specified, then the target environment information is in effect for the duration of the current session until one of the following events occur: the user logs off the session, the database system is restarted, the environment information is changed, and so forth.

If the IFP keyword is specified, then the target environment information is in effect on a current parsing engine for all sessions until one of the following events occur: the database system is restarted, the environment information is changed to a different target, and the environment information is reset to the same values as though for system level.

If the SYSTEM keyword is selected, then the target environment information is in effect for all sessions across all restarts until one of the following events occur: the environment information is changed, or target emulation is turned off.

In some example implementations, the syntax of a DIAGNOSTIC SET COSTS statement is as follows:
a. DIAGNOSITC SET COSTS TARGET_SYSTEM_NAME ON FOR [SESSION, REQUEST, IFP, SYSTEM, PSF, WM, ALL].

The keywords SESSION, REQUEST, IFP, and SYSTEM are explained above. The keywords PSF and WM indicate that priority scheduler settings and workload management information, respectively, are to be provided for target emulation. Similar syntax exists for the DIAGNOSTIC DUMP COSTS statement. The ALL option indicates that all environment information is to be captured.

Figure 4:
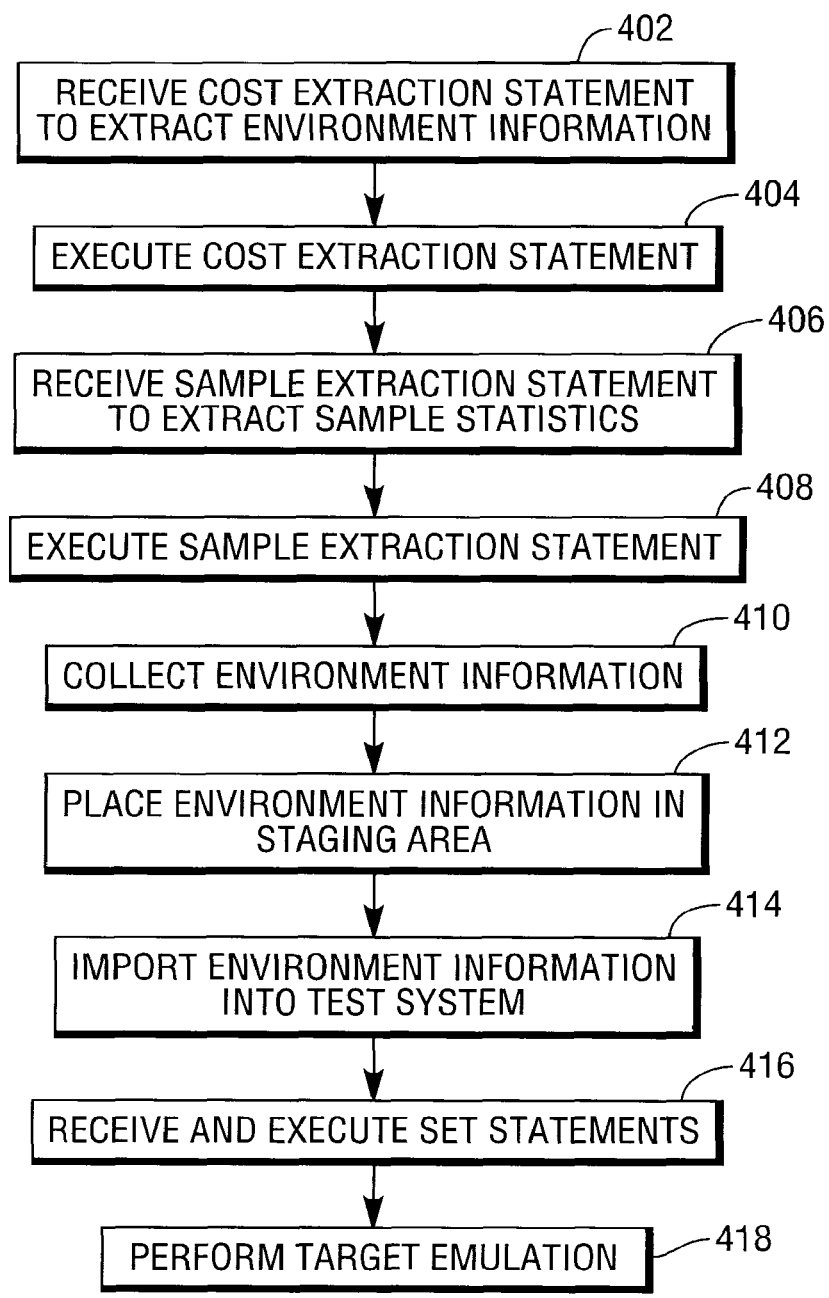
FIG. 4 is a flow diagram of a process of emulating a target database system at a test system, according to an embodiment.

FIG. 4 shows a process of performing target level emulation, in accordance with embodiment. The process of FIG. 4 can be performed by software executable in the target database system 14, and/or client emulation system 20, and/or test system 10. The process receives (at 402) a cost extraction statement to extract system-specific environment information. In some example implementations, the statement can be a DIAGNOSTIC DUMP COSTS statement that is received by the target database system 14.

The received statement is executed (at 404) in the target database system 14 to extract system-specific environment information of the target database system 14, including cost-related information as well as the workload management information and/or priority scheduler settings. In addition, the target database system 14 can optionally receive (at 406) a sample extraction statement to extract data sample statistics from the target database system 14. In some example implementations, the sample extraction statement can be a DIAGNOSTIC DUMP SAMPLES statement, which when executed (at 408) by the target database system 14 causes extraction of sample statistics from database tables or other structures in the target database system 14.

The environment information is collected (at 410) to define databases, tables, views, cost-related information, workload management information, priority scheduler settings, and random sample statistics to be captured for loading into the test system 10. The collected environment information is placed (at 412) in a staging area (e.g., data files 24 in the client emulation system 20 or a storage location in the target database system 14) for subsequent import into the test system 10.

Next, the system emulation tool 22 (in the client emulation system 20) is invoked to import (at 414) the data from the staging area (e.g., data files 24 in the client emulation system 20 or storage location in the target database system 14) to data structures in the test system 10. Next, the test system 10 receives and executes (at 416) statements to set the environment information, including, for example, a DIAGNOSTIC SET COSTS statement and a DIAGNOSTIC SET SAMPLES statement, to specify the setting of system-specific environment information (including cost-related information, workload management information, and priority scheduler settings), and random samples.

At this point, target emulation is performed (at 418), in which the environment of the target database system 14 is emulated, and the database management software 16 in the test system 10 runs in the emulated environment to perform various database management tasks, including query plan selection via the optimizer of the database management software 16.

Instructions of software described above (including the database management software 36, workload management subsystem 302, priority scheduler 304, operating system 306, database management software 16, workload management subsystem 322, priority scheduler 324, and operating system of FIG. 3, and system emulation tool 22 of FIG. 1) are loaded for execution on a processor (such as one or more processors 50, 52, 54, 56, 350, and 352 in FIGS. 1 and 2). Processors include microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving, in a test system having one or more processors, environment information of a target database system, wherein the environment information includes information relating to hardware and software components of the target database system, definitions of workloads in the target database system, and settings of a scheduler in the target database system;
   emulating, in the test system, an environment of the target database system using the received environment information;
   executing database software in the emulated environment in the test system;
   using the definitions of the workloads of the target system to perform workload management in the emulated environment in the test system; and
   using the settings of the scheduler of the target system to perform scheduling of tasks of database management software in the emulated environment in the test system.

2. The method of claim 1, wherein executing the database software in the emulated environment comprises performing query plan selection for a query in the emulated environment.

3. The method of claim 2, wherein performing the query plan selection comprises performing the query plan selection by an optimizer executing in the emulated environment.

4. The method of claim 1, wherein receiving the environment information comprises receiving the environment information that further includes random sample statistics of the target database system.

5. The method of claim 1, wherein receiving the environment information comprises receiving the environment information that further includes exception information that specifies actions to take in response to exceptions.

6. The method of claim 1, wherein the settings of the scheduler include scheduling weights assigned to scheduling allocation groups, wherein the scheduling weights indicate relative allocations to be provided to the allocation groups by the scheduler.

7. The method of claim 6, wherein the workloads correspond to plural workload management groups, wherein a mapping is provided between workload management groups and the scheduling allocation groups.

8. The method of claim 1, wherein receiving the environment information comprises receiving the environment information in response to one or more SQL (Structured Query Language) diagnostic statements.

9. The method of claim 8, further comprising:
   receiving, by the test system, the one or more SQL diagnostic statement that has options selectively set to indicate importation of one or more of the definitions of workloads and the scheduler settings into the test system.

10. The method of claim 9, wherein the options of the received one or more SQL diagnostic statements are further selectively set to indicate importation of the information relating to hardware and software components, and importation of random sample statistics.

11. The method of claim 1, wherein the settings of the scheduler include settings of a priority scheduler that interacts with an operating system of the test system to manage relative priorities of tasks of database management software.

12. A test system comprising:
    a network interface to receive environment information of a target database system, wherein the environment information includes information relating to hardware and software components of the target database system, and one or more of: definitions of workloads in the target database system, and settings of a scheduler in the target database system;
    one or more processors to emulate, in the test system, an environment of the target database system using the received environment information; and
    database software executable on the one or more processors in the environment.

13. The test system of claim 12, wherein the environment information further includes exception information associated with corresponding workloads, wherein the exception information specifies actions to take in response to exceptions.

* * * * *